(12) United States Patent
Ward

(10) Patent No.: X3342
(45) Date of Patent: Jun. 16, 1821

(54) GARMENTS, CUTTING

(76) Inventor: Allen Ward

Allen Ward

Letters Patent

The Schedule refered to in these Letters Patent and making part of the same containing a description in the words of the said Allen Ward himself of his improvement in the mode of marking out cloth for cutting into clothing by means of Plates & protractor & scale.

To cut out a coat by my system. I first make a protractor about 16 inches diameter; and divide the semicircle of the Protractor in to fifty equal parts. with the circle of the protractor placed from me, I begin on the left and number the degrees with the num ber one in the first degree. No 2 in the second. No 3. on the third: and so increase the numbers agreeably to the lines, which lines must be previously run from the middle of the straight edge of the protractor. No 25 will form a right angle with the straight edge of the protractor: I next proceed to make a scale the semi circumference of my customer's body taken close under his arms divided into 32 equal parts, and these parts numbered beginning at the left hand end. of the scale with No 1. on the first line, No 2. on the second, and so continue the figures upon the parts, until all the parts are numbered, which constitutes a scale suitable for the thickness round the breast, I make one scale al so for the waist in like manner having taken the length of the coat; I spread my cloth the nap running to my left. I apply the protractor and square my cloth by an angle of 25 degrees beginning at the right hand end of my cloth, which is generally termed the top of the cloth. from the near corner of which I run an angle of 2 degrees, which represents the back seam of the coat. from the upper corner I run down said seam, or angle one and a half of the scale and make a mark on said angle or back seam, from said mark I run down six and a half and make a second mark, from which I run across at right angles with the back seam, eleven of the scale, this will give the top of the back sigh and the breadth of the back between the shoul-
ders, from six and a half on the back line I proceed three and
a half lower and run another right line at angle of twenty
five degrees and run out on said line from the back seam 11
which will give the bottom and length of the back sigh.
the length of the waist being ascertained by the measure I run a
line across the nap of the cloth, sufficient for the breadth of
the skirt. say 6 inches from the intersection of the back seam
I run out on said line three and a half on the scale, which
gives the width of the back between the buttons, and one inch
and a half over for the plait on the square at the top of the cloth
I run across 3. which will give the width of the top of the
back. from which place I take a sweep of 30. of the scale
to the top of the back sigh, which sweep represents the shoulder
seam. I also take a sweep of 30 from the top to the bottom
of the back sigh which curves the back sigh. I also take a
sweep of 30 from 3 at the top of the back to one and a half
at the back seam which will curve the top of the back.
I also take a sweep of two lengths of the side seam from the
bottom of the back sigh to the width of the back at the hip
between the buttons which sweep represents the side seam of
the back. The back skirt is cut agreeably to the taste, thus
completes the marking of the back of a coat for the present fash-
ion. I next mark out the fore parts of the coat. First
I run a line from the top of my cloth to the length of the coat
parallel with and one and half inch from the fore and doub-
led edge of the cloth, which line is termed the plait line
I square said line at the top of my cloth and run down said
line five and a half. from thence down said line six and
a half. from thence down said line three and one fourth. from
five and a half I run an angle of sixteen and a half degrees
the intersection of which angle with the square line at the top
of the cloth will form the top of the shoulder seam. from thence I run down said seam line which will give the front of the
shoulder seam. I next run an angle from six and a half on
the plait line of 20 degrees. I come out on said angle nine
and three fourths to find the front of the sigh. from thence I
continue along said angle fourteen to find the top of the breast
I then run another angle from. three and a fourth on the plait line
by 23 of the protractor which is a right angle with my scale
I commence at the plait line and mark one on the far side of said
line from which I take a sweep of six. to the six and a half
on the plait line, which sweep will mark the top of the side
seam. from said three and a fourth on said plait line. I run six
in on the angle of 23 degrees. which six will give the bottom of
the sigh from thence I continue 21 on said angle to find the
[illegible] of the breast. from which point I take a sweep of 13 to the
top of the breast, from thence I take a sweep of fifteen to the top
of the shoulder seam which forms the gauge, from the point
of the shoulder seam to the front of the sigh. I take a sweep of
[illegible] to form the upper part of the sigh: from said nine and
three fourths or front of the sigh, to the bottom of the sigh, I
take a sweep of four and one fourth. which forms the under part
of the sigh. from the said bottom of sigh to six and a half on
the plait line. I take a sweep of six which forms the hind part
of the sigh, and the top of the side seam. from which top I run
down the plait line the length of the back side seam to find
the hips, and from thence to the bottom of the coat. from the
hip I run an angle of twenty one and a half degrees which forms
the flap line. I run along said line 20 numbers of a scale cor
responding with the waist measure and from said twenty. I
proceed nine further to the front of the waist from which I
take a sweep thirty two to curve the front of the breast below.
from twenty on said flap line I run an angle of 32, by which I
cut the skirt, an angle of 14 is to be run from the length of the
breast. on the skirt line which will form the bottom of the [illegible]

breast. That the coat may have spring in the hips. I cut off the bottom of the side seam half an inch, more or less cutting the coat across to 20 on the flap line. taking a sweep of 32 from said 20. to the hips: which sweep will cut the cloth bias and curving above the flap line. after which I cut off one number off the width of bottom of the side seam. and when seaming the curved and flap lines together the curved line must be held out to the plait line. the lapel must be cut seperate and seamed to the breast agreeably to taste; to form a sleeve I run a straight line. down the near edge of the cloth. I square said line at the top. I run down two of the breast scale, from which two I run an angle of nineteen degrees. for the width of the sleeve head. I run out on said angle fifteen. and to form the sleeve head I take a sweep of eight and a half. from two on the straight line to fifteen on the angle from the elbow of the sleeve I run an angle of five degrees to crook the sleeve by. and then cut the size and length of my sleeve by the customers measure: for crooked or straight men I run the angles differently to it; for a straight man I run the angles higher than described. and for a crooked man lower. I also add or diminish the number according to his size, that the neck may be regulated Exd. Witnesses
W.C. Wm Thornton }
Wm Elliot }

Allen Ward (1534 words)

DRAFTSMAN'S DIVISION.

All communications should be addressed to "The Commissioner of Patents, Washington, D. C."

2—328 a.

DEPARTMENT OF THE INTERIOR,

United States Patent Office.

Washington, D. C., ............ 189_

SIR:

The printed Copies of Patent No. allraid are exhausted.

June 16, 1852!

As soon as reprinted a copy will be mailed you to complete your order.

By direction of the Commissioner:

Very respectfully,

Chief Clerk.

314366-97-5m